Oct. 6, 1936.　　　A. VALENTIN ET AL　　　2,056,696
COMPLEX OBJECTIVE FOR THREE-COLOR PROJECTION
Filed March 28, 1935　　　2 Sheets-Sheet 1
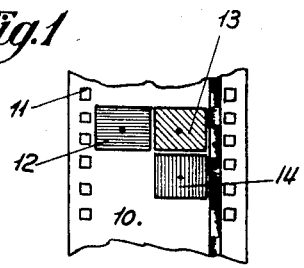
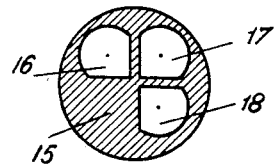
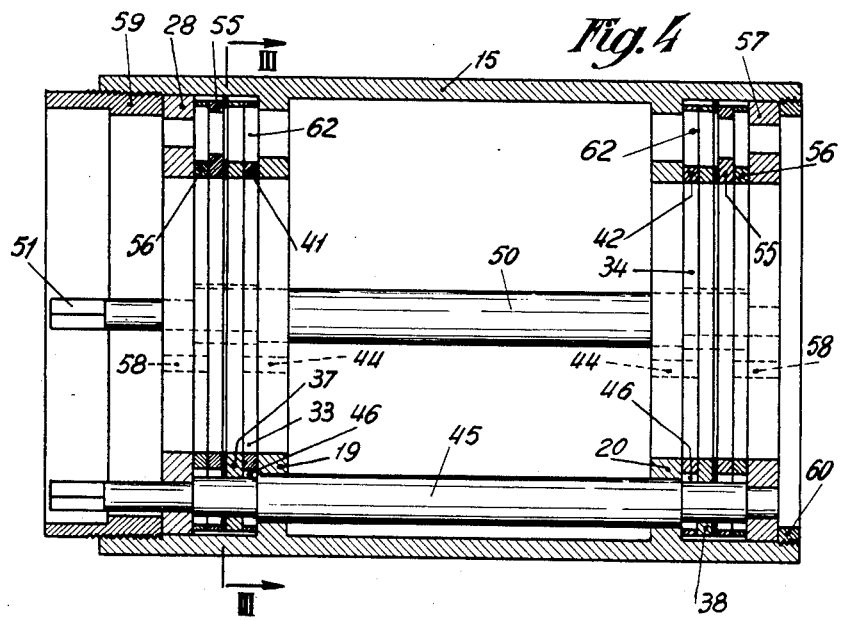
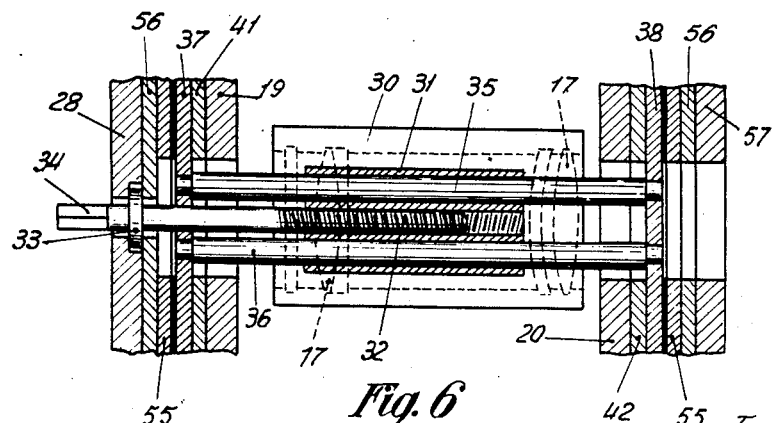
Inventor
Auguste Valentin
and Laurent Bassani
by [signature] attorney

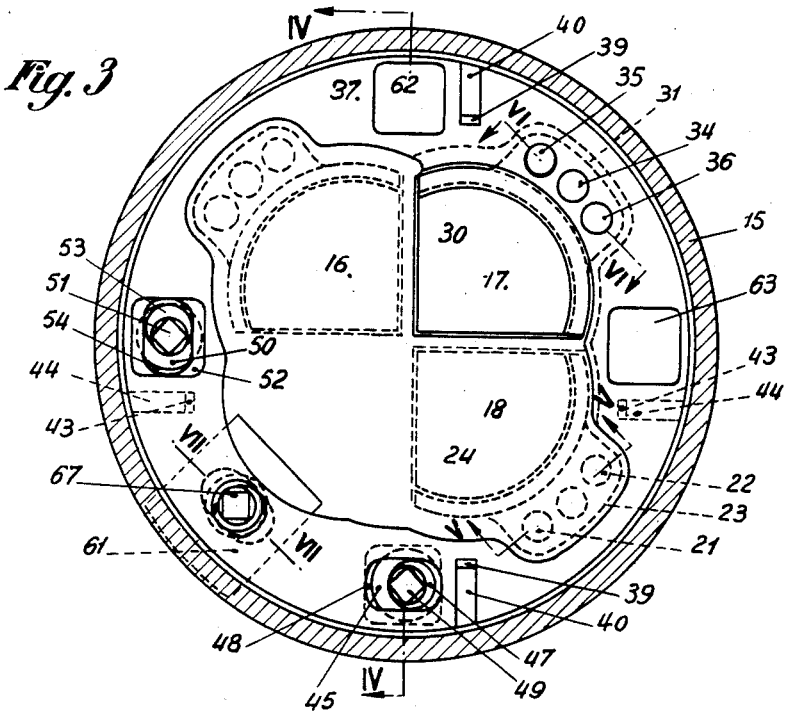
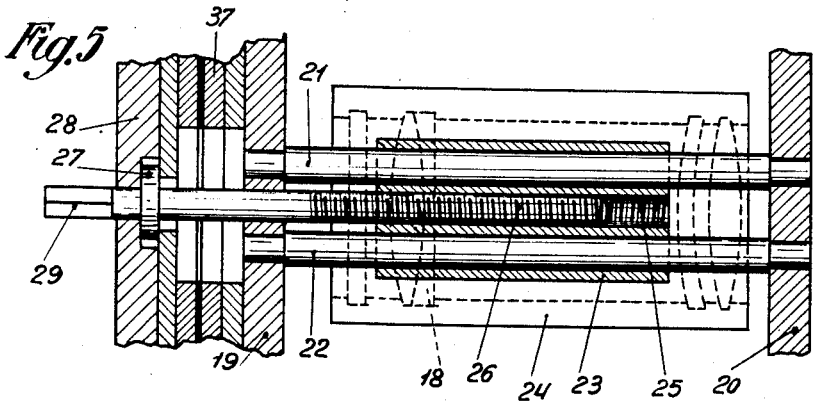
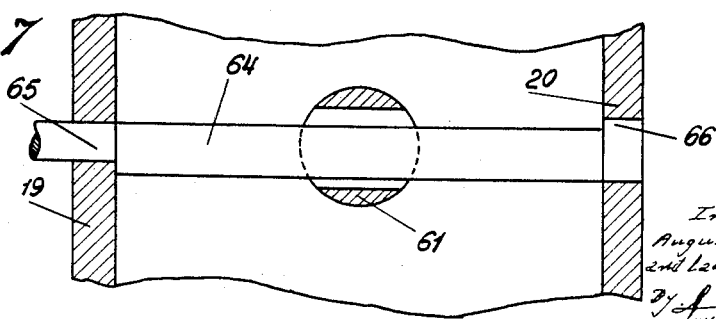

Patented Oct. 6, 1936

2,056,696

UNITED STATES PATENT OFFICE 2,056,696

COMPLEX OBJECTIVE FOR THREE-COLOR PROJECTION

Auguste Valentin and Laurent Bassani, Paris, France

Application March 28, 1935, Serial No. 13,572
In France April 12, 1934

4 Claims. (Cl. 88—16.4)

The present invention relates to three-color projection and more particularly to the cinematographic projection of "small image" films, that is to say, those comprising on the film in the normal space ordinarily reserved for one cinematographic image in black, three images of the same picture but smaller and projected simultaneously on the screen in colored light so as to reproduce the subject with its natural colors.

It is known that the utilization of such films does not necessitate, for the projecting apparatus, any modification in the feeding mechanism or in the sound reproducing members.

It is, however, necessary to substitute for the ordinary single objective, three elementary objectives suitably arranged and which must be focussed and centered exactly.

On the other hand, the common mounting or cage which carries these three objectives must be adapted to be introduced and fixed easily in all the objective-carrying tubes of the ordinary projecting apparatus.

According to the invention, the mount of each elementary objective is, for focussing, displaced by a longitudinal screw and is guided to this end on two small columns which, for one of the three objectives, are firmly fixed to the cage, but which for the two others, are mounted at each extremity in a ring carried in the interior of the cage and free to move under the action of an eccentric or other control device, in a definite direction, for example, horizontal, with respect to another ring attached to the first one and which itself can move also under the action of an eccentric or other member, with respect to the cage proper, and in another direction, for example vertical. Due to these different displacements, the three objectives in question may be focussed and exactly centred between themselves so as to obtain on the screen an exact superposing of three images projected simultaneously.

A construction of a multiple objective according to the invention is shown by way of example on the annexed drawings in which:

Figure 1 shows an example of a "small image" film,

Figure 2 is a diagrammatic view showing the relative position of the elementary objectives necessary for the projection of such a film;

Figure 3 is a section on a larger scale of a complex objective according to the invention;

Figure 4 is a longitudinal section on the line IV—IV of Figure 3 and of which the line III—III shows the sectional line represented by Figure 3;

Figure 5 is a section on the line V—V of Figure 3;

Figure 6 is a section on a smaller scale on the line VI—VI of Figure 3;

Figure 7 is a section on the line VII—VII of Figure 3.

In Figure 1 there is shown at 10 a cinematographic film arranged according to the "small image" method, that is to say, comprising in the normal space of an image (over the length of four of the perforations 11) three small images 12, 13, 14 corresponding, the first to the blue rays, the second to the green rays, and the third to the red rays.

For projecting such a film, it has already been proposed to use in a common mount or cage 15, three elementary objectives 16, 17 and 18 having the same relative positions as the images 12, 13 and 14, but as the multiple objective, the focal distance of which is evidently fixed, must be adaptable to the projection distance of the hall where it is used, it is necessary not only to separately focus the three objectives 16, 17 and 18, but also to shift transversely in two different directions, generally perpendicular, these objectives in order to obtain on the screen an accurate superposing of the projected images and to compensate the errors of parallax.

It is, furthermore, useless to make the three objectives movable and it is possible to obtain the whole range of relative positions necessary by leaving one of them, 18 for example, fixed and only displacing the two others, 16 and 17, parallel to each other.

Figures 3 to 7 show how these conditions may be fulfilled according to the invention. In these figures there is shown at 15 the external cylindrical cage of the objectives and in Figure 3 in particular there is shown the relative positions of the three objectives 16, 17, and 18.

The cylindrical cage 15 has on the inside two annular collars 19 and 20 which are used simultaneously with washers 28 and 57 for the fixing of the various parts which compose the optical system. As shown in Fig. 5, two guide rods 21 and 22 are fitted into the collars 19 and 20 and arranged parallel to the general axis of the system. The mount proper 24 of the elementary objective 18 is provided with an ear or lug 23 slidably mounted on rods 21 and 22.

There is also provided in the ear or lug 23 a longitudinal threaded bore 25 in which is positioned a screw 26 adapted to rotate freely in its supports but provided with a collar 27 carried in the fixed washer 28 which prevents any axial movement thereof. The screw 26 is terminated on the outside by a square head 29 which enables it to be rotated and to thereby effect the individual focussing of the objective 18.

The other objectives 16 and 17 are also held in mounts such as that shown at 30 in Figures 3 and 6 and which comprises an ear 31 (Figures 3 and 6) provided with a focussing screw 32 anchored by means of a collar 33 in the fixed washer 28 and terminated by a square head 34. The ear 31 of the mount or holder 30 is guided on the guide rolls 35 and 36 parallel to the axis of the system, and carried not by the collars 19 and 20 but by two rings 37 and 38, the diameter of which is, as shown by Figure 4, less than that of the space available inside the cage 15, in such manner that these rings may be given movements of a certain amplitude in a plane perpendicular to the axis of the system.

Each ring 37 or 38, comprises, as shown by Figure 3, two vertical slots such as 39, and in these slots 39 engage the tenons 40 with vertical faces and which both appertain to a second ring 41 and 42, interposed between the ring 37 or 38 and the collar 19 or 20 of the cage 15. Thus, the relative movements of the rings 37 and 38 with respect to the adjacent rings 41 and 42 can only take place in the vertical direction.

Nevertheless, each ring 41 or 42 itself also comprises two slots such as 43 (Figure 3) directed horizontally and each engaging on a tenon with horizontal faces 44 comprised by the collar 19 or 20 adjacent thereto.

Thus, the rings 41 and 42 can only carry out horizontal displacements, but since they carry with them the rings 37 and 38 which can shift vertically, it will be understood that there can be given to the objective 17 any desired position within the limits given by the play existing between the rings and the cage 15.

In Figures 3 and 4 is shown an example of members adapted to control as desired the movements of the rings which have just been described. To this end and in order to effect for example the vertical displacements of the rings 37 and 38, there is arranged a rod 45 carried by washers 28 and 57 and passing through the rings 41 and 42, in apertures 46 sufficiently large not to touch them.

Nevertheless, in the parts which pass through the rings 37 and 38, the rod 45 forms eccentric crank pins 47 (Figure 3) and the rings 37 and 38 comprise at this same spot, an opening 48 extended horizontally and being of the same width as the diameter of the crank pin 47. The rod 45 being terminated by a square head 49, it will be understood that if it is caused to rotate by means of a key, the desired vertical displacement of the rings 37 and 38 and consequently of the objective 17 is produced.

In the same way, another rod 50 carried by collars 19 and 20 and terminated by a square head 51, passes through the rings 37 and 38 in a large opening 52 but has on its passage in the rings 41 and 42, eccentric crank pins 53 engaging in vertical slots 54 of the said ring. Rotation of the rod 50 by means of a key, produces the displacement in the horizontal direction of the rings 41 and 42 and consequently of the objective 17.

The objective 16 comprises identical displacement members which in order to simplify the drawings have not been shown. Vertical movement rings 55 corresponding to the rings 37 and 38, and rings 56 corresponding to rings 41 and 42 for horizontal displacement are provided for effecting movement of objective 16.

For these latter, the fixed tenons 58 with horizontal faces are no longer carried by the collars 19 and 20 but by the fixed washers 28 and 57 firmly fitted in the cage 15 by threaded rings 59 and 60. The clamping of these washers is such that the rings 37, 38, 41, and 42 can move with a slight friction.

62 and 63 show openings provided for the rods controlling these rings 55 and 56.

It is to be noted that all the parts which constitute the centering and focussing devices according to the invention, are carried in the interior of the cylindrical cage 15, so that the latter can easily fit into the objective-holding tube of an ordinary projecting apparatus in place of the normal objective, and Figures 3 and 7 show members permitting the fixing of the cage in the tube to be ensured.

These parts comprise a pressing member 61 adapted to move radially out of the cage 15 and to be applied to the inner surface of the tube in which this cage is to be fixed. To this end, inside the cage 15, the pressing member 61 is traversed by a rod 64, eccentric with respect to its bearings 65 and 66 fitted in the collars 19 and 20.

An external square head 67 permits of the eccentric rod 64 being rotated and of causing the presser 61 to project more or less.

It should be understood that the invention is not restricted to the construction just described and it could undergo modifications of detail, thus in particular where the third image 14 of each picture is located on the axis of the film 10, the objective 18 is also located in such manner that its optional axis is in the central position.

In this case, instead of being in the form of a sector, the objectives 16, 17, and 18 may be circular.

We claim:—

1. An objective for projection in colors, comprising in combination a tubular cage, parallel rods mounted in the interior of said cage, mountings for elementary objectives carried by said rods, support rings receiving the ends of said rods, each support ring being connected for displacement in a transverse direction, an intermediate ring connected to said cage for displacement in another transverse direction, and actuating means on the exterior of said cage for displacing said support rings relative to the intermediate rings and said intermediate rings relative to said cage.

2. An objective for projection in colors, comprising in combination a tubular cage, parallel rods mounted in the interior of said cage, mountings for elementary objectives carried on said rods, support rings receiving the extremities of said rods, each support ring being connected for displacement in a transverse direction, an intermediate ring connected to the cage for displacement in another transverse direction, and actuating means on the exterior of said cage for displacing said support rings relative to the intermediate rings and the intermediate rings relative to the cage, said means comprising rods carried by the cage and eccentrics engaging respectively in the intermediate rings and in the support rings.

3. A complex objective for projection in colors, comprising in combination a tubular cage, parallel rods fixed at their ends in the interior of said cage, elementary objectives mounted on said rods, and means for fixing the cage in the interior of a projection apparatus comprising a presser member susceptible of radial adjustment relative to the cage and exterior control means for radially displacing said presser member.

4. A complex objective for projection in colors, comprising in combination a tubular cage, parallel rods fixed at their ends in the interior of said cage, elementary objectives mounted on said rods, and means for fixing the cage in the interior of a projection apparatus comprising a presser member adapted to be radially adjusted relative to the cage, a rod rotatably engaged in the cage, and an eccentric on said rod engaging said presser member.

AUGUSTE VALENTIN.
LAURENT BASSANI.